(12) United States Patent
Johansson et al.

(10) Patent No.: US 9,120,043 B2
(45) Date of Patent: Sep. 1, 2015

(54) FILTER SENSOR

(75) Inventors: Ronald C. Johansson, Stillwater, MN (US); Vivek Bharti, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1231 days.

(21) Appl. No.: 11/420,949

(22) Filed: May 30, 2006

(65) Prior Publication Data

US 2007/0277592 A1 Dec. 6, 2007

(51) Int. Cl.
- *B01D 53/22* (2006.01)
- *B01D 46/00* (2006.01)
- *B01D 46/44* (2006.01)

(52) U.S. Cl.
CPC .......... *B01D 46/0086* (2013.01); *B01D 46/444* (2013.01)

(58) Field of Classification Search
USPC .......................... 96/417, 421, 422; 55/DIG. 34
See application file for complete search history.

(56) References Cited

U.S. PATENT DOCUMENTS

| | | |
|---|---|---|
| 2,700,362 A | 1/1955 | Calling |
| 2,746,416 A | 5/1956 | Aufderheide |
| 2,782,747 A | 2/1957 | Alderfer |
| 3,024,655 A | 3/1962 | Dwyer et al. |
| 3,071,914 A | 1/1963 | Gesmar |
| 3,126,739 A | 3/1964 | Whitehill |
| 3,172,746 A | 3/1965 | Shuck |
| 3,397,395 A * | 8/1968 | Pierce ............................ 340/607 |
| 3,696,666 A | 10/1972 | Johnson et al. |
| 3,740,931 A | 6/1973 | Nowicki |
| 3,914,995 A | 10/1975 | Yoshida |
| 3,934,543 A | 1/1976 | Howard |
| RE30,782 E | 10/1981 | van Turnhout |
| 4,629,479 A | 12/1986 | Cantoni |
| 4,786,295 A * | 11/1988 | Newman et al. ................. 96/400 |
| 4,813,948 A | 3/1989 | Insley |
| 5,009,225 A * | 4/1991 | Vrabel ..................... 128/201.24 |
| 5,036,698 A * | 8/1991 | Conti ................................ 73/38 |
| 5,131,932 A | 7/1992 | Glucksman |
| 5,205,156 A | 4/1993 | Asano et al. |
| 5,230,800 A | 7/1993 | Nelson |
| 5,351,035 A | 9/1994 | Chrisco |
| 5,352,255 A | 10/1994 | Taft |

(Continued)

FOREIGN PATENT DOCUMENTS

| | | |
|---|---|---|
| CA | 2059262 | 7/1993 |
| DE | 197 20 577 A1 | 11/1998 |

(Continued)

OTHER PUBLICATIONS

MSI (Piezo Film Sensors Technical Manual) Apr. 2, 1999.*

(Continued)

*Primary Examiner* — Jason M Greene
*Assistant Examiner* — Anthony Shumate
(74) *Attorney, Agent, or Firm* — Kenneth B. Wood

(57) ABSTRACT

A filter life sensor assembly within an air handling system is disclosed. The air handling system includes an air flow intake, an air flow exit, and a filter disposed between the air flow intake and air flow exit. The filter sensor assembly comprises a bypass connecting the air flow intake to the air flow exit, a dielectric sensor adjacent the bypass, wherein the dielectric sensor generates an electrical signal in response the air flow passing through the bypass.

15 Claims, 3 Drawing Sheets

(56) References Cited

U.S. PATENT DOCUMENTS

| | | | |
|---|---|---|---|
| 5,429,649 A * | 7/1995 | Robin | 96/405 |
| 5,668,535 A | 9/1997 | Hendrix et al. | |
| 6,013,121 A | 1/2000 | Chiu et al. | |
| 6,077,336 A | 6/2000 | Ulrich et al. | |
| 6,096,224 A | 8/2000 | Champie | |
| 6,110,260 A | 8/2000 | Kubokawa | |
| 6,382,305 B1 * | 5/2002 | Sano | 165/43 |
| 6,412,435 B1 | 7/2002 | Timmons, Jr. | |
| 6,432,168 B2 * | 8/2002 | Schonauer | 95/18 |
| 6,537,347 B2 * | 3/2003 | Motouji et al. | 95/8 |
| 6,837,922 B2 | 1/2005 | Gorin | |
| 6,894,620 B2 | 5/2005 | Reinhardt et al. | |
| 7,001,451 B2 | 2/2006 | Kim | |
| 7,621,978 B2 | 11/2009 | Johansson | |
| 2003/0168389 A1 * | 9/2003 | Astle et al. | 210/85 |
| 2006/0032379 A1 | 2/2006 | Kates | |

FOREIGN PATENT DOCUMENTS

| | | |
|---|---|---|
| DE | 198 31 414 C1 | 3/2000 |
| JP | 63-274422 | 11/1988 |
| KR | 20-0235271 | 6/2001 |
| KR | 10-2003-0023891 | 3/2003 |

OTHER PUBLICATIONS

Webster's Third New International Dictionary, Unabridged 1993.*

Encyclopædia Britannica. Encyclopædia Britannica Online. Encyclopædia Britannica, "Piezoelectric ceramics" 2009. Web. Dec. 1, 2009.*

"MiniSense 100 Vibration Sensor," MSI Sensors <http:\\www.piezofilm.com>.

* cited by examiner

FILTER SENSOR

BACKGROUND

The present inventions relates to a filter life sensor. In particular, the present invention relates to a dielectric filter life sensor.

Air handling systems, such as air furnaces, air conditioning systems, and room air purifiers, typically include filters to take the dust and other particulate matter out of the air. When these filters become dirty, the air flow through the filter is reduced. The filters therefore must be periodically changed or cleaned to maintain the efficiency of the air handling system. A typical recommendation is to change a filter on a household air handling system every three months. It is often difficult for users to remember to change the filter. Additionally, a recommendation for changing a filter based on a predetermined time does not factor in the actual conditions of the environment. In some instances, the filter may become clogged before the suggested three months, and in some conditions the filter may still adequately perform beyond three months.

Filter change sensor systems exist for measuring the end of the useful life of a filter. Such systems may include a device, such as a float, for measuring the pressure drop across the filter. These systems are generally complicated and some require sensor placement on each side of the filter for measuring the pressure drop. Some of these systems measure the air velocity through the filter. However, because the area of filters is generally large, the air velocity through a filter is quite low and measuring the actual quantity of air passing through the filter is difficult. In such cases, sensitive, specialized equipment is necessary to obtain accurate readings, which are expensive and not practical for consumer use.

Other systems exist that include an air bypass through or around the filter. In such systems, when the filter collects dirt and dust, the overall air flow is restricted causing more air to flow through the bypass, which in some cases is a whistle device. These systems will then whistle when the air flow through the bypass reaches a threshold level. These systems do not give a read-out, either a digital or analog signal, on the level of filter use. Additionally, these systems only indicate filter performance at the filter location and therefore do not communicate with the thermostat, which is normally placed at the location more visible to the user. Therefore, it would be desirable to have a low-cost filter sensor that is able to determine the actual end of the useful life of the filter.

SUMMARY

The present invention provides a filter life sensor that is able to determine the end of the useful life of the filter by utilizing a bypass either through a portion of the filter or through the housing around the filter and a dielectric sensor adjacent the bypass to measure the change in the air stream passing through the bypass.

In one embodiment, the filter life sensor is for use with an air handling system. The air handling system includes an air flow intake, an air flow exit, and a filter disposed between the air flow intake and air flow exit. The filter sensor assembly comprises a bypass connecting the air flow intake to the air flow exit, a dielectric sensor adjacent the bypass, wherein the dielectric sensor generates an electrical signal in response the air flow passing through the bypass.

Figure 1:
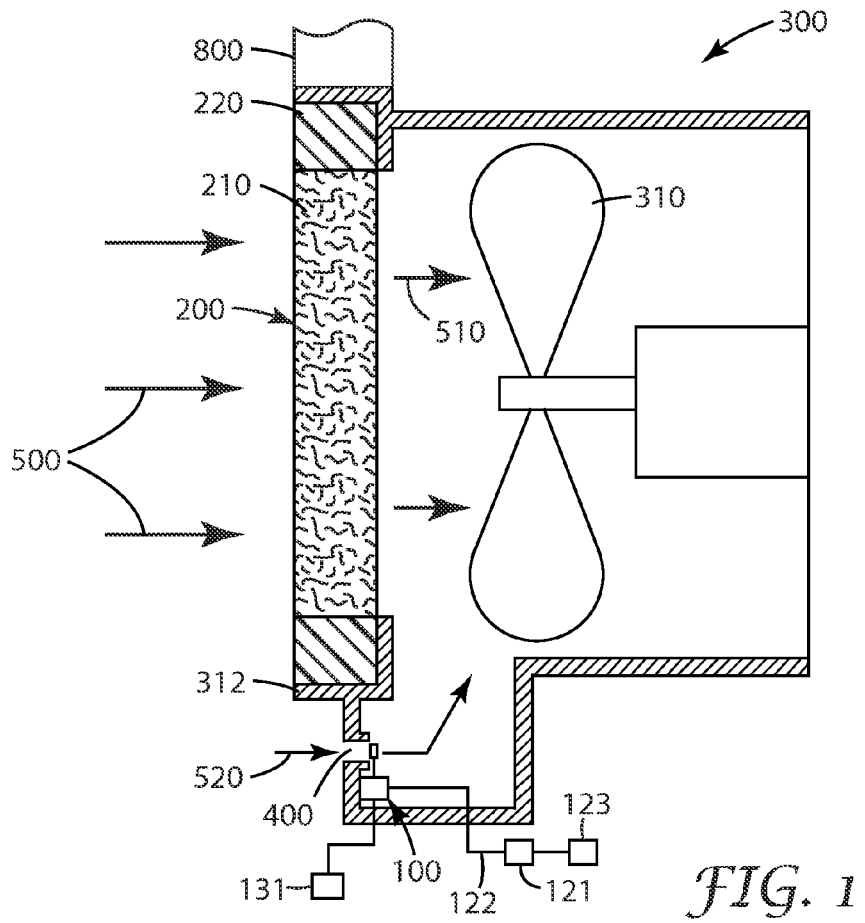
FIG. 1 is a side view of an air handling system with a bypass in the housing.

While the above-identified drawings and figures set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of this invention. The figures may not be drawn to scale.

DETAILED DESCRIPTION

An air flow sensor 100 is disclosed for determining the life of a filter 200. The air flow sensor is used within a housing 300 of an air handling system 800, such as a furnace, air conditioner, a room air purifier, or a respirator such as a powered air purifying respirator (PAPR), which utilizes a filter 200. However, the air flow sensor 100 shown and described may be used and applied in other comparable systems where periodic changing of the filter 200 is necessary.

Generally, the filter 200 includes a filter media 210 surrounded and contained by a filter frame 220. The entire filter 200 may be disposable, the filter media 210 may be disposable such that the filter frame 220, or the entire filter 200 may be reusable.

The filter media 210 may be constructed of paper; porous films of thermoplastic or thermoset materials; nonwoven, such as melt blown or spunbond, webs of synthetic or natural fibers; scrims; woven or knitted materials; foams; electret or electrostatically charged materials; fiberglass media, or laminates or composites of two or more materials. A nonwoven polymeric web of polyolefin, polyethylene or polypropylene is suitable, for example. Filter media 210 may also include sorbents, catalysts, and/or activated carbon (granules, fibers, fabric, and molded shapes). Electret filter webs can be formed of the split fibrillated charged fibers as described in U.S. Pat. No. RE 30,782. These charged fibers can be formed into a nonwoven web by conventional means and optionally joined to a supporting scrim such as disclosed in U.S. Pat. No. 5,230,800 forming an outer support layer. Alternatively, filter media 210 can be a melt blown microfiber nonwoven web, such as disclosed in U.S. Pat. No. 4,813,948 which can be joined to a support layer during web formation as disclosed in that patent, or subsequently joined to a support web in any conventional manner.

The filter frame 220 generally entirely surrounds the filter media 210. The filter frame 220 may be constructed of paper, chipboard, cardboard, paperboard, boxboard, film, metal or plastic. In an entirely disposable filter, the filter frame 220 typically will be constructed of a paper product. In a reusable filter frame 220, the filter frame 220 typically will be constructed of plastic or metal.

The filter 200 is inserted into a housing 300. Particularly, a supporting slot 312 is included in the housing to closely engage the filter frame 220 of the filter 200. Depending on the air handling system, the housing 300 may be a portion of a furnace, an air conditioner, or a room air purifier. Within the housing 300 is a fan 310 for pulling air through the filter 200 such that there is air in 500 the filter and air out 510 of the filter and into the housing 300.

As the air in 500 passes through the filter 200 and is then pulled out of the filter as air out 510, the filter media 210 clogs with dirt, dust, or debris, and air flow through the filter 200 becomes limited and the pressure drop across the filter 200 increases. However, due to the size of the areas of the filter 200 it is difficult to measure the air flow change. Further, although it is possible to measure the pressure drop across the filter 200, such systems must include delicate sensors.

Disclosed is a bypass 400 shown either in the housing 300 (FIGS. 1 and 2) or in the filter 200 (FIGS. 3 and 4), which allows for a narrow path of bypass air flow 520 not passing through the filter media 210. A detailed description of FIGS. 1-4 is given below. Due to the constricted size of the bypass 400 and therefore increased air velocity of the bypass air flow 520, the bypass air flow 520 is easier to measure. It is understood that the bypass 400 may be included in other locations of the housing 300 or various positions on the filter 200 including on the filter media 210 or the filter frame 220.

An air flow sensor 100 is included to measure the bypass air flow 520. As the filter 200 becomes clogged, the fan still continues to pull air through the filter 200 and bypass 400, however the pressure drop across the filter 200 and bypass 400 is greater and therefore the bypass air flow velocity 520 increases. A threshold level may be preset and when the bypass air flow 520 reaches that threshold level, an indication can be made to change the filter 200. The air flow sensor 100 shown is a piezoelectric sensor. However, generally the air flow sensor 100 is a dielectric sensor, which can be a sensor such as piezoelectric sensor, piezoresistive sensor, actuator sensor, capacitive sensor, and/or combinations thereof. The dielectric sensor can be one sensor or an array of sensors. The sensor 100 generates an electrical signal such as a voltage, current, or both in response to actuation caused by the bypass air flow 520. The out put of the sensor 100 can be used to create sound, light, and/or communicate with an output such as a thermostat or a combination thereof.

Figure 2:
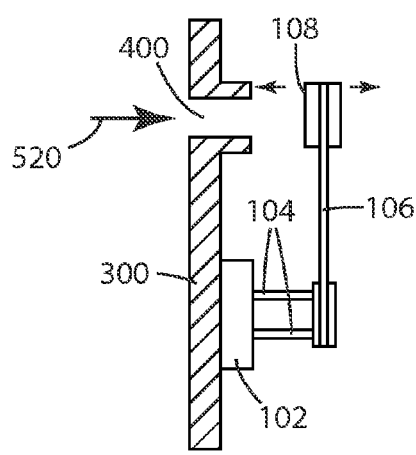
FIG. 2 is a side view of an embodiment of an air flow filter sensor adjacent the bypass of FIG. 1.

FIG. 1 is a side view of a housing 300 of an air handling system with a bypass 400 in the housing 300 and an air flow sensor 100 adjacent the bypass 400. FIG. 2 is an enlarged view of the air flow sensor 100 adjacent the bypass 400 of FIG. 1.

As shown, a standard filter 200 with a filter media 210 surrounded by a filter frame 220 is included to capture dirt, dust and debris being pulled through the housing 300 of the air handling system. The bypass 400 is an unobstructed opening through a portion of the housing 300. In this embodiment, the bypass 400 is just below the support slot 312 that holds the filter 200. It is understood that any opening, connecting the air in 500 to the air out of the filter 510 (preceding the fan) without passing through the filter media 210 would be appropriate and that any one particular position of the bypass is not required.

The air flow sensor 100 shown a piezoelectric sensor (described in more detail below) and is positioned adjacent the bypass 400. In this embodiment, the air flow sensor 100 is positioned on the downstream end of the bypass air flow 520. In other words, the air flow sensor 100 is within the housing 300 directly adjacent the bypass 400. It is understood that the air flow sensor 100 may be positioned anywhere such that the bypass air flow 520 is being measured. For example, the air flow sensor 100 may be positioned adjacent the bypass 400 on the upstream end of the bypass air flow 520 to measure the pull of the bypass air flow 520 as opposed to the push of the bypass air flow 520. Additionally, the air flow sensor 100 may be positioned within the bypass 400.

Figure 3:
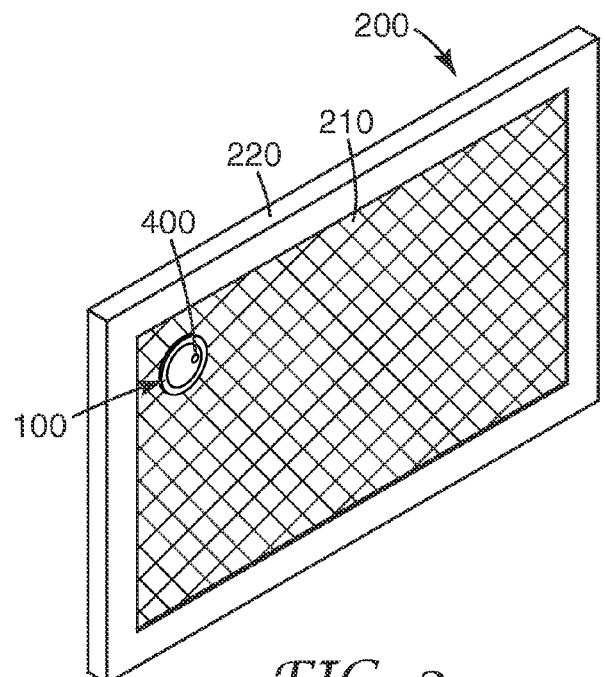
FIG. 3 is a perspective view of an embodiment of a filter containing a bypass and an air flow sensor.
Figure 4:
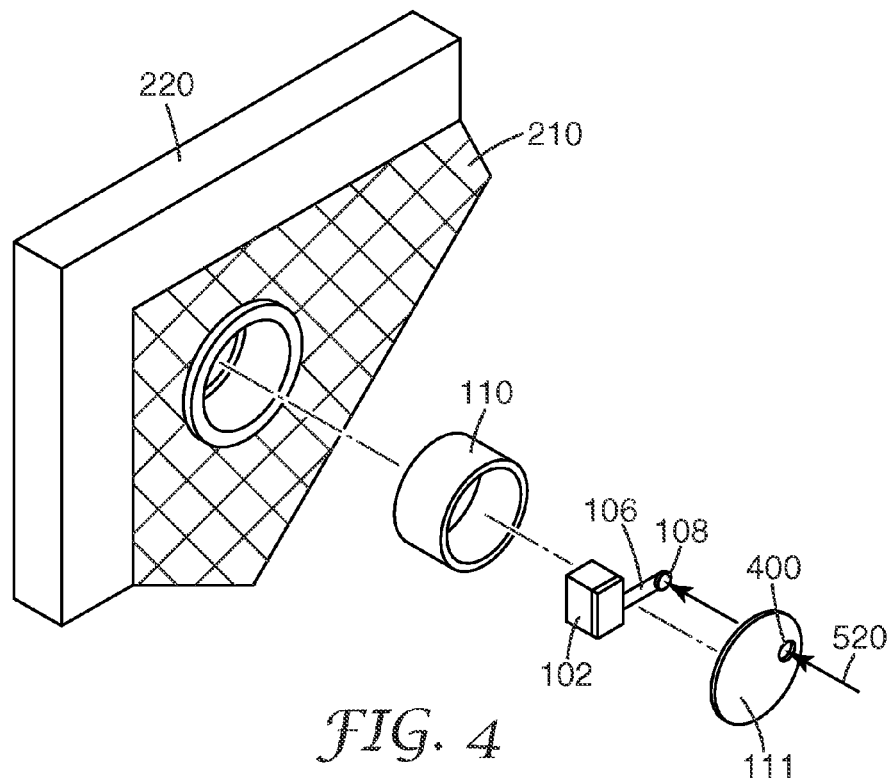
FIG. 4 is an enlarged, exploded view of the filter, bypass and air flow sensor of FIG. 3.

FIG. 3 is a perspective view of an embodiment of a filter 200 that includes a bypass 400 and an air flow sensor 100. FIG. 4 is an enlarged, exploded view of the filter 200, bypass 400, and air flow sensor 100 of FIG. 3. The filter 200 depicted in FIGS. 3 and 4 would typically be used in the housing 300 of an air handling system that itself does not contain a bypass 400, because the bypass 400 and air flow sensor 100 is included as part of the filter 200. It is understood that the air handling system that the filter 200 of FIGS. 3 and 4 is placed in includes a fan to generate an air in the filter 200 and an air out of the filter 200 such as that shown and described with respect to FIG. 2. An axial fan is shown; however, other types of fans can be used such as a centrifugal or an vane axial fan. Therefore, through the bypass 400 is a bypass air flow 520, cylinder As shown in FIG. 3, and in the exploded view of FIG. 4, a tube 110 and a cover 111 for the tube 110 encloses the air flow sensor 100 and includes the bypass 400. As shown, the tube 110 is positioned within and across a portion of the filter media 210. However, it is understood that the tube 110, or other enclosing structure, could be placed across the filter frame 220. Additionally, the tube 110 may be place outside of the filter frame 220 or filter media 210, while the bypass 400 still passes through the filter frame 220 or filter media 210. The tube 110 is shown to be generally circular; however, because the tube 110 serves simply as an enclosing structure for the air flow sensor 100 and includes an opening for the bypass 400, the tube 110 may be of any shape such as square, rectangular, oval, triangular.

Contained within the tube 111 is the air flow sensor 100, which as described above with respect to the embodiment depicted in FIG. 2, is a piezoelectric sensor. An exemplary piezoelectric sensor that may be used is MiniSense 100 Vibration Sensor available from MSI Sensors of Hampton, Va.

The piezoelectric air flow sensor 100, described above with respect to FIGS. 1-4, includes a base 102 that in FIGS. 1-2 attaches the air flow sensor 100 to the housing 300 or as shown in FIGS. 3-4 attaches the air flow sensor 100 to the tube 110, voltage leads 104 (not visible in FIG. 4), a bending arm 106, and a weighted end 108 at the end of the bending arm 106 and aligned with the bypass air flow 520 path exiting the bypass 400. It is understood that voltage lead 104 may not be necessary, for example when the output signal is transmitted remotely. On the bending arm 106 is the piezoelectric material. As shown in both embodiments, the air flow sensor 100 is positioned on the down stream end of the bypass 400 to measure the push of the bypass air flow 520. It is understood that the air flow sensor 100 could be positioned up stream from the bypass 400 or within the tube 110 to measure the bypass air flow 520.

The bypass air flow 520 contacts the weighted end 108 to causes steady vibration of the bending arm 106. This vibration causes the piezoelectric material on the bending arm 106 to generate an electrical signal such as a voltage, current or a combination of both. As the filter media 210 clogs with dirt, dust, and debris, the bypass air flow 520 increases causing the frequency and amplitude of the vibration of the bending arm 106 of the air flow sensor 100 to increase and therefore the voltage generated to increase. Generally, a voltage is generated that is associated with each speed of the fan 310. To get an accurate reading from the air flow sensor 100 it is desirable to have proper air flow through the bypass 400. Have a tube-like path (as shown in FIGS. 1 and 2) for the bypass airflow 520 to pass through before contacting the weighted end 108 may assist getting proper air flow through the bypass 400.

Generally, a fan speed will cause the sensor 100 to generate an electrical signal such as a voltage. Initially, it may be desirable to calibrate the sensor 100 for the particular fan speed. If a variable speed fan is included that has for example 3 speeds associated with it, it is desirable to calibrate the sensor 100 for that speed that will be used. It may be desirable to have the fan on a single, possibly high, speed to get a repeatable output reading from the air flow sensor 100.

Figure 5:
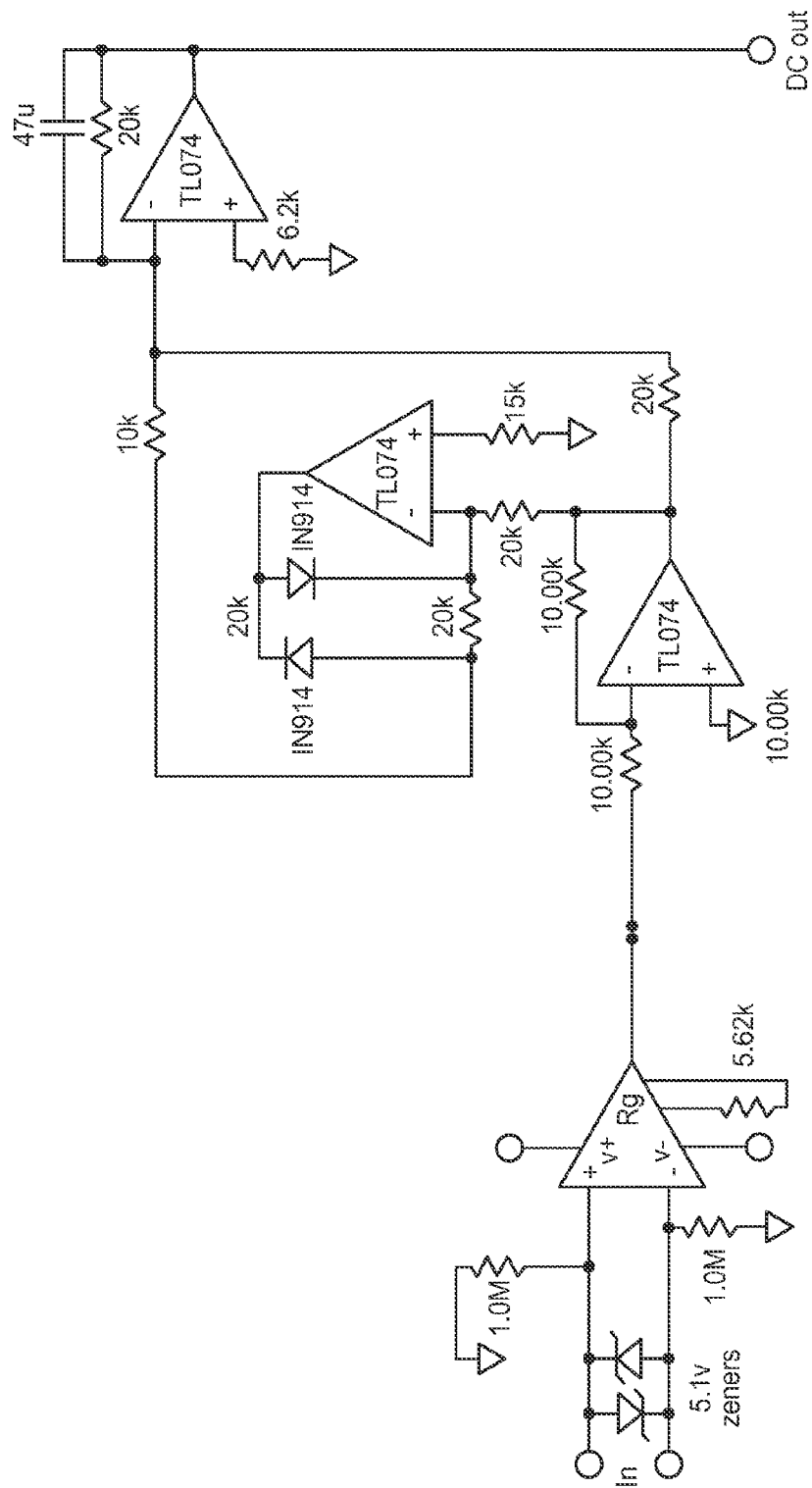
FIG. 5 is an embodiment of a circuit diagram for amplifying, rectifying, and filtering the voltage generated from the air flow sensor.

The output voltage signal from the air flow sensor 100 may be amplified, rectified, and filtered. The output voltage signal may be transmitted to a relay box 121 that converts the voltage output into a measurement of the filter condition life. An exemplary amplification, rectification, and filtration circuit is show in FIG. 5 for the piezoelectric sensor MiniSense 100 Vibration Sensor available from MSI Sensors of Hampton, V.A The transmission of the output signal may be through wire 122 or may be through remote transmission such as radio frequency. In the embodiment depicted in FIGS. 3 and 4, transmission through a remote mechanism such as radio frequency is ideal in that no wires must be connected to the tube 110. The relay box 121 may connect with a display 123.

The converted signal may then be made visible to a user. In one embodiment, a percentage used output is transmitted and is available for viewing by the user. In another embodiment, a red, yellow, or green light may be indicated, the colors corresponding to a percentage of the filter 200 used and the need for the user to replace the filter 200. This final output may be positioned at a convenient location to a user such as at a thermostat. Alternatively, an alarm may signal. It is understood that it maybe either the output signal or a converted form of the output signal that is transmitted from the filter sensor 100 or relay box.

It may be necessary in some embodiments to include a power source to amplify and transmit the air flow sensor 100 output. This is particularly the case when a remote transmission mechanism is included such as a radio frequency transmitter. In such a case a battery 131 may be included. That battery may be disposable or rechargeable. Alternative, the circuit can be designed where the sensor electrical output can be stored and that stored electrical output is used to transmit the signal. For example, the continual movement of vibration of the bending arm 106 of the air flow sensor 100 may generate enough voltage to charge the battery or capacitor, if included.

The air flow sensor can be used for multiple applications. As described, the air flow sensor described may be used with a furnace system, room air purifier, or air conditioner. Additionally, the air flow sensor may be used with a respirator to monitor the air flow to the user of the respirator. The output signal generated may be transmitted and monitored at an external area.

Disclosed is an air flow sensor for providing reminder to a user of when to change a filter. It may be desirable to incorporate into the air handling system other types of sensors such as a timer or other sensors that measure the airflow through the filter or pressure drop across the filter. For example a suitable time system is disclosed in U.S. patent application Ser. No. 11/420,936 titled "FILTER TIMER", now issued as U.S. Pat. No. 7,621,978.

Although specific embodiments of this invention have been shown and described herein, it is understood that these embodiments are merely illustrative of the many possible specific arrangements that can be devised in application of the principles of the invention. Numerous and varied other arrangements can be devised in accordance with these principles by those of ordinary skill in the art without departing from the spirit and scope of the invention. Thus, the scope of the present invention should not be limited to the structures described in this application, but only by the structures described by the language of the claims and the equivalents of those structures.

What is claimed is:

1. A filter life sensor assembly within an air handling system which includes an air flow intake, an air flow exit, and a filter disposed between the air flow intake and air flow exit, the filter life sensor assembly comprising:
a bypass connecting the air flow intake to the air flow exit;
a dielectric sensor adjacent the bypass;
wherein the dielectric sensor generates an electrical signal in response to the air flow passing through the bypass, and wherein the filter life sensor assembly transmits an output signal indicative of the filter condition, the output signal resulting from a measurement of air flow passing through the bypass and not resulting from a measurement of air flow passing through the filter.

2. The filter life sensor assembly of claim 1, wherein the dielectric sensor is a piezoelectric sensor.

3. The filter life sensor assembly of claim 1, further comprising a battery.

4. The filter life sensor assembly of claim 3, wherein the battery is a rechargeable battery.

5. The filter life sensor assembly of claim 1, further comprises a circuit that is generating power by actuation of the dielectric sensor.

6. The filter life sensor assembly of claim 1, wherein the dielectric sensor further comprises a signal transmitter to communicate the output signal with a relay box.

7. The filter life sensor assembly of claim 6, wherein the signal transmitter is a wire connecting the dielectric sensor to the relay box.

8. The filter life sensor assembly of claim 6, wherein the signal transmitter is a radio frequency transmitter transmitting from the dielectric sensor to the relay box.

9. The filter life sensor assembly of claim 6, wherein the relay box determines a condition of the filter based on the output signal.

10. The filter life sensor assembly of claim 7, wherein the relay box connects with a display to display the condition of the filter.

11. The filter life sensor assembly of claim 8, wherein the relay box connects with a display to display the condition of the filter.

12. The filter life sensor assembly of claim 11, wherein the filter comprises a frame surrounding a filter media and the bypass extends through the frame of the filter.

13. The filter life sensor assembly of claim 11, wherein the filter comprises a frame surrounding a filter media and the bypass extends through the filter media of the filter.

14. The filter life sensor assembly of claim 1, wherein the bypass extends through a portion of the air handling system.

15. The filter life sensor assembly of claim 1, wherein the air handling system is a furnace, room air purifier, air conditioner, or respirator.

* * * * *

UNITED STATES PATENT AND TRADEMARK OFFICE
CERTIFICATE OF CORRECTION

PATENT NO. : 9,120,043 B2
APPLICATION NO. : 11/420949
DATED : September 1, 2015
INVENTOR(S) : Ronald Johansson et al.

It is certified that error appears in the above-identified patent and that said Letters Patent is hereby corrected as shown below:

IN THE SPECIFICATION

Column 2
Line 40, Delete "media," and insert -- media; --, therefor.

Column 3
Line 38, Delete "out put" and insert -- output --, therefor.

Column 4
Line 32, Delete "111" and insert -- 110 --, therefor.

Column 5
Line 58, Delete "TIMER"," and insert -- TIMER" (docket 62095US002), --, therefor.

Signed and Sealed this
Twenty-second Day of March, 2016

Michelle K. Lee
*Director of the United States Patent and Trademark Office*